(12) United States Patent
Belot

(10) Patent No.: US 6,195,784 B1
(45) Date of Patent: Feb. 27, 2001

(54) CIRCUIT FOR DETECTING RECEPTION ERRORS IN AN ASYNCHRONOUS TRANSMISSION

(75) Inventor: Didier Belot, Rives (FR)

(73) Assignee: SGA-Thomson Microelectronics S.A., Gentilly (FR)

( * ) Notice: Subject to any disclaimer, the term of this patent is extended or adjusted under 35 U.S.C. 154(b) by 0 days.

(21) Appl. No.: 09/082,927

(22) Filed: May 21, 1998

(30) Foreign Application Priority Data

May 28, 1997 (FR) .................................................. 97 06820

(51) Int. Cl.[7] ...................................................... G06F 11/00
(52) U.S. Cl. ......................... 714/798; 714/811; 713/503
(58) Field of Search ............................ 714/700, 798, 714/815, 811, 814; 375/360, 354, 355, 371, 375, 373; 395/551, 555; 713/400, 401, 500, 501, 503

(56) References Cited

U.S. PATENT DOCUMENTS

| 4,737,971 | 4/1988 | Lanzafame et al. | 375/118 |
|---|---|---|---|
| 4,800,340 | 1/1989 | Maimone et al. | 331/1 A |
| 4,876,701 | * 10/1989 | Sanner | 375/354 |
| 4,935,942 | * 6/1990 | Hwang et al. | 375/354 |
| 4,984,255 | 1/1991 | Davis et al. | 375/106 |
| 5,331,669 | * 7/1994 | Wang et al. | 375/371 |
| 5,463,655 | 10/1995 | Llewellyn | 375/359 |
| 5,708,381 | * 1/1998 | Higashisaka | 327/276 |

\* cited by examiner

*Primary Examiner*—Christine T. Tu
(74) *Attorney, Agent, or Firm*—Wolf, Greenfield & Sacks, P.C.; James H. Morris; Theodore E. Galanthay

(57) ABSTRACT

The present invention relates to a circuit of reception of bits transmitted on an asynchronous signal, including a circuit for providing a clock reconstructed from the asynchronous signal, this clock being used to sample the asynchronous signal to form a synchronous output signal, and a reception error detection circuit. The reception error detection circuit includes an edge detector providing a detection pulse for each edge of predetermined direction of the asynchronous signal; and an alarm circuit activating an alarm signal when an edge of predetermined direction of the synchronous signal occurs outside a detection pulse.

23 Claims, 3 Drawing Sheets

CIRCUIT FOR DETECTING RECEPTION ERRORS IN AN ASYNCHRONOUS TRANSMISSION

BACKGROUND OF THE INVENTION

1. Field of the Invention

The present invention relates to a circuit for receiving bits transmitted asynchronously, and more specifically to a reception error detection circuit.

2. Discussion of the Related Art

FIG. 1 schematically shows a circuit for receiving bits transmitted on an asynchronous signal Din. Signal Din is provided to a phase-locked loop (PLL) 10 to reconstruct a clock signal CKR, the period of which is in principle equal to the width of the bits of signal Din. Reconstructed clock CKR is used to sample asynchronous signal Din by means of a flip-flop 12 that provides the sampled bits on a synchronous signal Ds. Ideally, signal CKR is such that flip-flop 12 samples each bit of asynchronous signal Din at its center.

The accuracy of reconstructed clock CKR depends on several factors, especially on the regularity of the variation of asynchronous signal Din. Asynchronous signal Din is random, but it can often convey several consecutive bits at a same state, which causes a drift of phase-locked loop 10 towards a lower frequency. Further, parasitic pulses in asynchronous signal Din are likely to cause a drift of phase-locked loop 10 towards a higher frequency.

When the frequency of reconstructed clock CKR is not exactly set on the transmission rate of asynchronous signal Din, the circuit inevitably ends up making sampling errors.

FIG. 2 shows an example of a timing diagram of the signals of the circuit in FIG. 1, illustrating an error occurring when the frequency of reconstructed clock CKR is higher than the transmission rate of the bits on signal Din. For simplification, the signals have been shown in square form. In reality, these signals have smooth transitions. The switching and propagation delays of the flip-flops have also been neglected.

In this example, the successive bits transmitted on signal Din switch at each bit, and signal Din is sampled upon each rising edge of clock signal CKR.

Upon the first rising edge of clock CKR, a bit of signal Din, at 1, is sampled in ideal conditions, that is, substantially at its center. Signal Ds switches to 1 during this rising edge.

At a given time, two successive rising edges of clock CKR, here the fourth and fifth rising edges, occur within a same bit of signal Din. In other words, the same bit is sampled twice, which causes an error. In the example of FIG. 2, synchronous signal Ds conveys, at the time of occurrence of the error, two successive bits at 0.

When clock CKR is too slow, at a given time, two of its successive rising edges occur before and after a bit of signal Din, which causes the loss of this bit.

A conventional solution to detect errors in such a system is to compare the control signal of the oscillator of phase-locked loop 10 with high and low thresholds substantially equidistant from the nominal value of the control signal. When the control signal reaches one of these thresholds, this means that the phase-locked loop has drifted, and thus that the reconstructed clock is wrong. The thresholds must be sufficiently far apart from the nominal value so that they are not reached by variations of the control signal around the nominal value, due to noise and to manufacturing tolerances. Thus, the error detection reacts particularly slowly and, when it reacts, a significant unknown number of bits are erroneous.

SUMMARY OF THE INVENTION

An object of the present invention is to provide a fast response error detection circuit.

Another object of the present invention is to provide such an error detection circuit which provides an indication for each erroneous bit.

These and other objects are achieved in a circuit for receiving bits transmitted on an asynchronous signal, including a circuit for providing a clock reconstructed from the asynchronous signal, this clock being used to sample the asynchronous signal to form a synchronous output signal, and a reception error detection circuit. The reception error detection circuit includes an edge detector providing a detection pulse for each edge of predetermined direction of the asynchronous signal; and an alarm circuit activating an alarm signal when an edge of predetermined direction of the synchronous signal occurs outside a detection pulse.

According to an embodiment of the present invention, the alarm circuit includes a flip-flop for sampling the detection pulses at edges of predetermined direction of the synchronous signal and activates the alarm signal when the output of the sampling flip-flop switches.

According to an embodiment of the present invention, the edge detector provides a detection pulse for each rising edge and a detection pulse for each falling edge of the asynchronous signal, the alarm circuit activating the alarm signal when a rising edge of the synchronous signal occurs outside a detection pulse corresponding to a rising edge of the asynchronous signal or when a falling edge of the synchronous signal occurs outside a pulse corresponding to a falling edge of the asynchronous signal.

According to an embodiment of the present invention, the edge detector includes a first flip-flop clocked from the asynchronous signal, receiving an active state on its data input, and providing detection pulses; and a second flip-flop clocked from the reconstructed clock receiving the detection pulses on its data input, and providing a reset signal for the first flip-flop.

According to an embodiment of the present invention, the second flip-flop is clocked by the complement of the reconstructed clock, the first flip-flop being directly clocked by the asynchronous signal to detect rising edges or by the complement of the asynchronous signal to detect falling edges.

The foregoing objects, features and advantages of the present invention will be discussed in detail in the following non-limiting description of specific embodiments in connection with the accompanying drawings.

DETAILED DESCRIPTION

Figure 1:
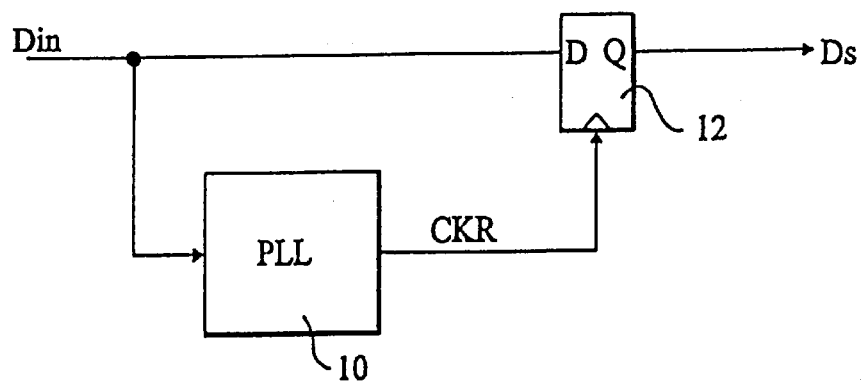
FIG. 1, previously described, schematically shows a conventional circuit for receiving bits transmitted asynchronously.

A reception error detection circuit according to the present invention is designed to detect the edges of the asynchronous signal and to check that the corresponding edges effectively occur in the synchronous signal.

FIG. 3 shows again sampling flip-flop 12 clocked by reconstructed clock CKR, receiving asynchronous transmission signal Din and providing synchronous signal Ds. Asynchronous signal Din is provided to a rising edge detector formed of two D-type flip-flops 21 and 22, and to a falling edge detector formed of two D-type flip-flops 24 and 25. Flip-flops 21 and 24 are respectively clocked by signal Din and by the complement of this signal Din. Each of flip-flops 21 and 24 receives state 1 on its data input D. Thus, as soon as signal Din has a rising edge, flip-flop 21 switches to state 1 and as soon as signal Din has a falling edge, flip-flop 24 switches to state 1.

Flip-flops 22 and 25 are used to reset flip-flops 21 and 24 at the latest at the end of one period of reconstructed clock CKR from the setting to 1 of flip-flops 21 and 24. Flip-flops 22 and 25 are clocked by the complement of clock CKR and respectively receive the Q outputs of flip-flops 21 and 24. Outputs RUP and RDN of flip-flops 22 and 25 are respectively provided to priority reset inputs R of flip-flops 21 and 24.

With this configuration, flip-flop 21 provides a pulse UP upon each rising edge of signal Din and flip-flop 24 provides a pulse DN upon each falling edge of signal Din, the width of these pulses being at most equal to one period of reconstructed clock CKR.

Pulses UP are sampled by a D-type flip-flop 27 at the rising edges of synchronous signal Ds, while pulses DN are sampled by a D-type flip-flop 28 at the falling edges of signal Ds. When at least one of outputs QUP and QDN of flip-flops 27 and 28 switches to zero, this means that an edge of synchronous signal Ds does not occur during a pulse UP or DN, and thus that this edge does not occur sufficiently close to a corresponding edge of asynchronous signal Din. Thus, an alarm signal AL is activated by a NAND gate 30 when one of outputs QUP and QDN of flip-flops 27, 28 switches to zero.

Figure 2:
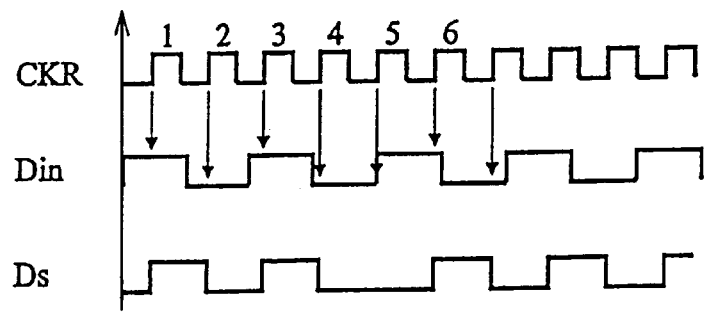
FIG. 2 previously described, illustrates an error occurring when the frequency of a reconstructed clock is too high with respect to the transmission rate of the bits.
Figure 3:
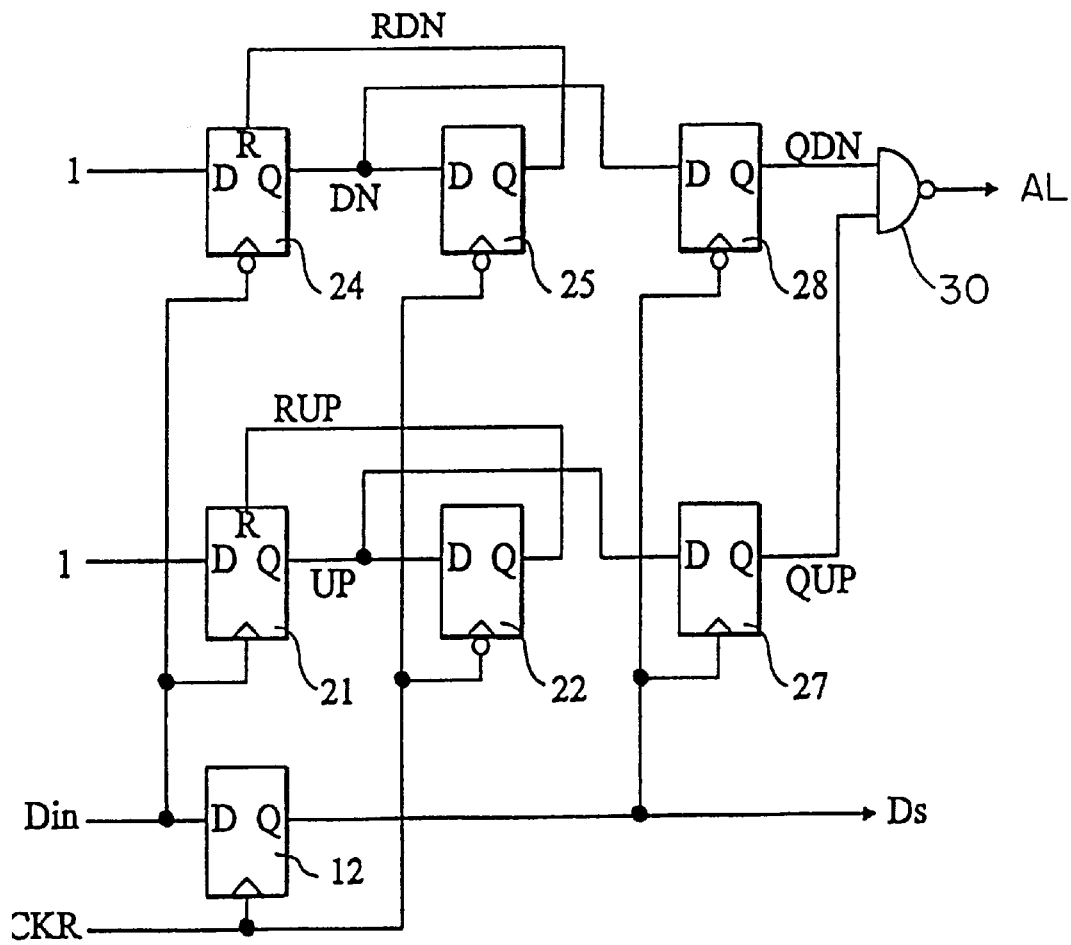
FIG. 3 shows an embodiment of an error detection circuit according to the present invention.
Figure 4:
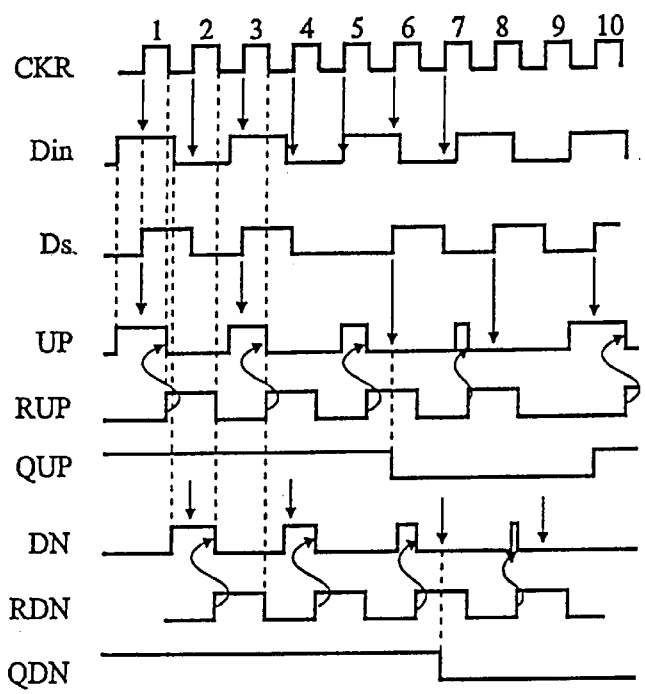
FIG. 4 shows a timing diagram illustrating the operation of the circuit of FIG. 3 when the frequency of the reconstructed clock is higher than the bit transmission rate.

FIG. 4 shows a timing diagram illustrating the operation of the circuit of FIG. 3, as an example, in the same case as that of FIG. 2, that is, where the frequency of reconstructed clock CKR is higher than the bit transmission rate on asynchronous signal Din.

For clarity, the switching and propagation delays of the flip-flops are neglected in the timing diagrams and the signals are represented in square form.

As already mentioned in relation with FIG. 2, an error occurs around the fifth clock pulse CKR, where signal Ds conveys two successive bits at zero, whereas the states of these two bits should be different. The width of pulses UP and DN appears to progressively decrease, which decreases the chances for signals UP and DN to be sampled at state 1 by the edges of synchronous signal Ds. The two first rising edges of signal Ds each occurs during a pulse UP, but the third rising edge of signal Ds occurs after the third pulse UP, which causes the switching to zero of signal QUP, and thus the assertion of alarm signal AL.

Similarly, the two first falling edges of synchronous signal Ds each occurs during a pulse DN, but the third falling edge of signal Ds occurs after the third pulse DN, which causes the switching to zero of signal QDN. Alarm AL is asserted by the first of signals QUP and QDN which switches to zero (here, signal QUP).

FIG. 4 also shows reset signals RUP and RDN of flip-flops 21 and 24, respectively. Signal RUP takes the state of signal UP upon each falling edge of reconstructed clock CKR. As soon as signal RUP switches to 1, signal UP is set to zero. Similarly, signal RDN takes the state of signal DN upon each falling edge of clock CKR and sets signal DN to zero as soon as it switches to 1. For clarity, the drawings do not take into account the propagation times of the flip-flops.

Figure 5:
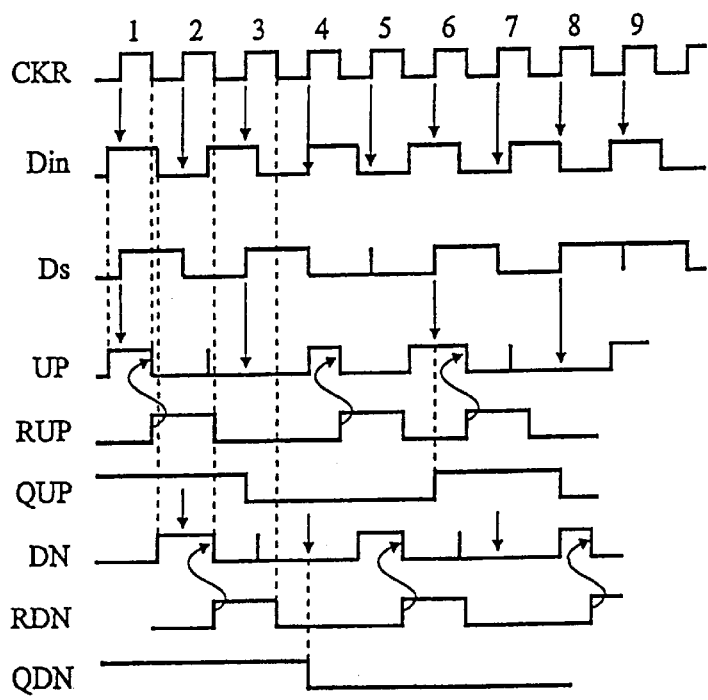
FIG. 5 shows a timing diagram illustrating the operation of the circuit of FIG. 3 when the frequency of the reconstructed clock is lower than the bit transmission rate.

FIG. 5 shows a timing diagram of the same signals as FIG. 4, illustrating the operation of the circuit of FIG. 3 when the frequency of reconstructed clock CKR is lower than the bit transmission rate on signal Din. In this case, at a given time, two successive sampling edges of clock CKR, here the fourth and fifth rising edges, occur before and after a bit of signal Din (here at 1). As a result, synchronous signal Ds conveys an erroneous bit, here at the fifth rising edge of signal CKR.

The waveforms of signals UP and DN differ from those of FIG. 4. Indeed, some pulses UP and DN are missing with respect to the number of rising and falling edges of signal Din. For example, when the second rising edge of signal Din occurs, reset signal RUP of signal UP appears to still be at 1, since the next falling edge of clock CKR, which is meant to cause the switching of signal RUP, only occurs after the rising edge of signal Din. As a result, signal UP is maintained at zero during the rising edge of signal Din, since the setting to zero has the priority. A similar phenomenon occurs in signal DN for the second falling edge of signal Din.

The first rising edge of signal Ds occurs properly during the first pulse UP and the first falling edge of signal Ds occurs properly during the first pulse DN. However, the second rising and falling edges of signal Ds occur outside pulses UP and DN, which causes the switching to zero of signals QUP and QDN upon these edges. Alarm signal AL is asserted as soon as the falling edge of signal QUP occurs.

It appears from FIG. 5 that an alarm is asserted even before the error occurs in synchronous signal Ds. This does not constitute a risk of incorrect error detection since, even if the frequency of signal CKR varies in the direction tending to compensate the error, this variation would be so slow that the error would occur anyway.

In FIGS. 4 and 5, it should be further noted that an error is detected in the vicinity of the error occurrence, which means that an error is detected almost immediately. Further, at least one of signals QUP and QDN, as can be seen for signal QUP in FIGS. 4 and 5, switches to the low state, then switches back to the high state for each error. This enables the number of errors to be detected by counting the number of falling edges of that of signals QUP and QDN which switches most often.

If the asynchronous signal varies regularly as shown in the examples, a single edge detector 21 or 22 can be used, associated with its sampling flip-flop 27 or 28. Indeed, one will note that, in case of an error, each of signals QUP and QDN switches to indicate an error.

However, if asynchronous signal Din is likely to convey a large number of consecutive bits at the same state, it is preferable to use both edge detectors to obtain faster detection. Indeed, only the falling edge detector is used after several consecutive bits at 1, whereas only the rising edge detector is used after several consecutive bits at zero.

Of course, the present invention is likely to have various alterations, modifications, and improvements which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A circuit for receiving bits transmitted on an asynchronous signal, including a circuit for providing a clock signal reconstructed from the asynchronous signal, this clock signal being used to sample the asynchronous signal to form a synchronous output signal, and a reception error detection circuit, wherein the reception error detection circuit includes:
   an edge detector providing a detection pulse for each edge of predetermined direction of the asynchronous signal; and
   an alarm circuit activating an alarm signal when an edge of predetermined direction of the synchronous signal occurs outside a detection pulse;
   wherein the edge detector provides a detection pulse for each rising edge and a detection pulse for each falling edge of the asynchronous signal, the alarm circuit activating the alarm signal when a rising edge of the synchronous signal occurs outside a detection pulse corresponding to a rising edge of the asynchronous signal or when a falling edge of the synchronous signal occurs outside a pulse corresponding to a falling edge of the asynchronous signal.

2. The circuit of claim 1, wherein the alarm circuit includes a sampling flip-flop for sampling the detection pulses at edges of predetermined direction of the synchronous signal and activates the alarm signal when the output of the sampling flip-flop switches.

3. The circuit of claim 1, wherein the edge detector includes a rising edge detector and a falling edge detector.

4. The circuit of claim 3, wherein said rising edge detector comprises a first pair of flip-flops.

5. The circuit of claim 4, wherein said falling edge detector comprises a second pair of flip-flops.

6. The circuit of claim 5, wherein each pair of flip-flops includes an input flip-flop and an output flip-flop.

7. The circuit of claim 6, wherein the input flip-flop of both pairs is clocked by the asychronous signal.

8. The circuit of claim 7, wherein the output flip-flops of both pairs is clocked by the clock signal.

9. The circuit of claim 6, wherein each of the input flip-flops receives a one-state on its data input.

10. The circuit of claim 6, wherein the outputs of the output flip-flops are used to reset their respective input flip-flops.

11. The circuit of claim 6, further including a third pair of flip-flops for providing a sampling function.

12. The circuit of claim 11, wherein the input flip-flop of the rising edge detector has its output coupled to the data input of its corresponding sampling flip-flop.

13. The circuit of claim 12, wherein the input flip-flop of the falling edge detector has its output coupled to the data input of its corresponding sampling flip-flop.

14. The circuit of claim 13, further including a nand gate and wherein the outputs of the sampling flip-flops coupled to corresponding inputs of the nand gate.

15. The circuit of claim 14, wherein an alarm signal is activated by the nand gate when one of the outputs of the sampling flip-flops switches to zero.

16. The circuit of claim 1, wherein the edge detector includes:
   a first flip-flop clocked from the asynchronous signal, receiving an active state on its data input, and providing detection pulses; and
   a second flip-flop clocked from the reconstructed clock receiving the detection pulses on its data input, and providing a reset signal for the first flip-flop.

17. A circuit for receiving bits transmitted on an asynchronous signal, including a circuit for providing a clock signal reconstructed from the asynchronous signal, this clock signal being used to sample the asynchronous signal to form a synchronous output signal, and a reception error detection circuit, wherein the reception error detection circuit includes:
   an edge detector providing a detection pulse for each edge of predetermined direction of the asynchronous signal; and
   an alarm circuit activating an alarm signal when an edge of predetermined direction of the synchronous signal occurs outside a detection pulse;
   wherein the edge detector includes:
      a first flip-flop clocked from the asynchronous signal, receiving an active state on its data input, and providing detection pulses; and
      a second flip-flop clocked from the reconstructed clock receiving the detection pulses on its data input, and providing a reset signal for the first flip-flop.

18. The circuit of claim 17, wherein the second flip-flop is clocked by the complement of the reconstructed clock, the first flip-flop being directly clocked by the asynchronous signal to detect rising edges or by the complement of the asynchronous signal to detect falling edges.

19. The circuit of claim 17, wherein the alarm circuit includes a sampling flip-flop for sampling the detection pulses at edges of predetermined direction of the synchronous signal and activates the alarm signal when the output of the sampling flip-flop switches.

20. The circuit of claim 17, wherein said first flip-flop comprises a rising edge detector flip-flop and a falling edge detector flip-flop.

21. The circuit of claim 20, wherein said second flip-flop comprises a first reset flip-flop for resetting said rising edge detector flip-flop and a second flip-flop for resetting said falling edge detector flip-flop.

22. The circuit of claim 21, further comprising a first output flip-flop coupled from said rising edge detector flip-flop and a second output flip-flop coupled from said falling edge detector flip-flop.

23. The circuit of claim 22, further including a gate coupled from outputs of said output flip-flops and providing at its output an alarm signal.

* * * * *

UNITED STATES PATENT AND TRADEMARK OFFICE
CERTIFICATE OF CORRECTION

PATENT NO. : 6,195,784 B1  
DATED : February 27, 2001  
INVENTOR(S) : Didier Belot Page 1 of 1

It is certified that error appears in the above-identified patent and that said Letters Patent is hereby corrected as shown below:

<u>Title page,</u>  
Item [73] should read: [73] Assignee: SGS-Thomson Microelectronics S.A., Gentilly, (FR)

Signed and Sealed this

Ninth Day of October, 2001

Attest:

*Nicholas P. Godici*

NICHOLAS P. GODICI  
*Attesting Officer*  
*Acting Director of the United States Patent and Trademark Office*